W. THOMPSON.
Scrapers.

No. 155,394. Patented Sept. 29, 1874.

Witnesses:
H. E. Metcalf
Cyrus Wilson

Inventor,
Woodard Thompson
By C. A. Shaw
Atty

UNITED STATES PATENT OFFICE.

WOODARD THOMPSON, OF GARDINER, MAINE.

IMPROVEMENT IN SCRAPERS.

Specification forming part of Letters Patent No. 155,394, dated September 29, 1874; application filed March 11, 1874.

*To all whom it may concern:*

Be it known that I, WOODARD THOMPSON, of Gardiner, in the county of Kennebec and State of Maine, have invented a certain new and useful Improvement in Hod Road-Scrapers, of which the following is a description sufficiently full, clear, and exact to enable any person skilled in the art or science to which my invention appertains to make and use the same, reference being had to the accompanying drawing forming a part of this specification, in which—

Figure 1:
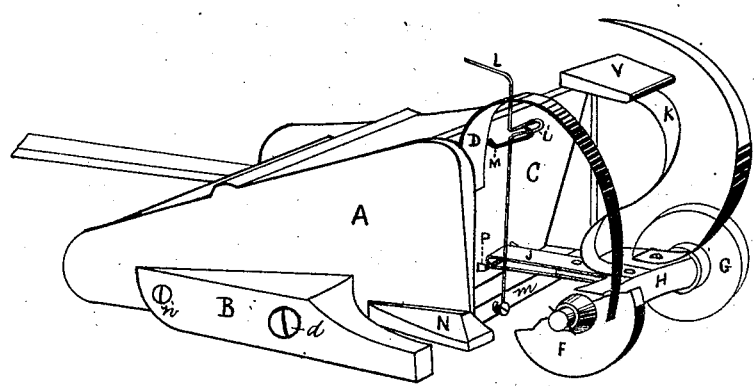
Figure 2:
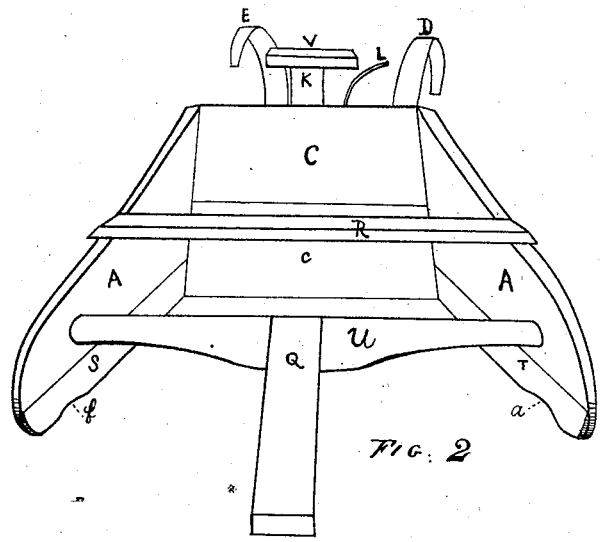

Figure 1 is an isometrical perspective view of my improved scraper. Fig. 2 is a front elevation of the same.

Like letters refer to like parts in the different figures of the drawing.

My invention relates to that class of scrapers known as self-loading; and consists in a novel construction and arrangement of the parts, as hereinafter more fully set forth and claimed, the object being to furnish a scraper of greater capacity and more easily operated than those heretofore constructed.

In Fig. 1, A C is the body or hod of the scraper; B, a gage-board; D, the lifter, and L the set-rod, attached to the skid or leveler $m$, and working in the staple M. Attached to the rear of the hod by the draft-bar J and staple P is the driver's carriage, consisting of the wheels F G, disposed on the axle H, and carrying the spring K, seat V, and steady-bar or guard E.

In Fig. 2, A A C is the body of the scraper, provided with the spade or cutter $c$ and mold-boards S T. A tongue, Q, is attached to the roller U, and there is a cross-bar, R, for connecting the opposite sides and strengthening the scraper. The mold-boards S T are concaved longitudinally on their inner surfaces, and provided with the shares or cutters $a\,f$.

It will be understood that each side of the hod is provided with a gage, B, pivoted on the screws $n$, and rendered adjustable by the screw $d$, and that the gages are raised or lowered according to the work to be done, or whether it is desired to plow deeply or otherwise.

The scraper is so balanced that when the gages B are raised to their fullest extent, and the skid or leveler $m$ is drawn up by the rod L, and fastened by the projection $i$ and staple M, the nose of the hod and shares $a\,f$ will be raised from the ground, permitting the scraper to be drawn along upon the shoes N without ploughing or loading itself; but when the gages B are lowered to their fullest extent, the shares $a\,f$ will be brought into contact with and enter the ground, thus plowing or filling the hod.

The lift D is so arranged that the driver can readily raise the body of the hod in dumping it without leaving his seat, and the guard E is to prevent the driver from falling from the seat V.

The skid $m$ is hinged to the body of the hod, and is used not only to assist in keeping the nose of the hod to the ground, but as a drag or leveler, and may be arranged to be secured in any desired position by the rod L.

I am aware that a hod-scraper having a cutter, $c$, and mold-boards S T has long been known and used, and I therefore do not claim the same when in and of itself considered; but What I do claim is—

The combination of the mold-boards S T with cutter $c$, skid $m$, and rod L, substantially in the manner and for the purpose specified.

WOODARD THOMPSON.

Witnesses:
 PHILIP WINSLOW,
 I. N. TUCKER.